(12) United States Patent
Tyan et al.

(10) Patent No.: US 8,545,947 B2
(45) Date of Patent: Oct. 1, 2013

(54) TRANSPARENT SUBSTRATE WITH OPTICAL COMPENSATION ABILITY AND LIQUID CRYSTAL DISPLAY USING THE SAME

(75) Inventors: Horng Long Tyan, Hsinchu (TW); Chyi Ming Leu, Hsinchu County (TW); Hang Chang Chang, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 1211 days.

(21) Appl. No.: 11/674,158

(22) Filed: Feb. 13, 2007

(65) Prior Publication Data
US 2008/0113120 A1  May 15, 2008

(30) Foreign Application Priority Data
Nov. 13, 2006  (TW) ................................ 95141859 A

(51) Int. Cl.
*G02F 1/1333*  (2006.01)

(52) U.S. Cl.
USPC .............. 428/1.6; 428/1.3; 349/117; 349/158

(58) Field of Classification Search
USPC ............ 428/1.3, 1.6; 349/106, 158, 117–118
See application file for complete search history.

(56) References Cited

U.S. PATENT DOCUMENTS

| | | | | |
|---|---|---|---|---|
| 4,792,476 A | * | 12/1988 | Numata et al. ................ | 428/209 |
| 5,608,033 A | * | 3/1997 | Nihira et al. .................. | 528/353 |
| 5,907,378 A | * | 5/1999 | Abileah et al. ................ | 349/123 |
| 5,986,036 A | * | 11/1999 | Gierow et al. ................ | 528/170 |
| 6,100,365 A | * | 8/2000 | Matsumoto et al. ........... | 528/170 |
| 6,200,655 B1 | * | 3/2001 | Gibbons et al. ................ | 428/1.2 |
| 6,204,902 B1 | * | 3/2001 | Kim et al. ...................... | 349/112 |
| 6,623,913 B2 | * | 9/2003 | Tanioka et al. ................ | 430/321 |
| 6,660,441 B2 | * | 12/2003 | Yu ............................... | 430/58.05 |

(Continued)

FOREIGN PATENT DOCUMENTS

| | | |
|---|---|---|
| CN | 1621910 | 6/2005 |
| CN | 1791832 A | 6/2006 |
| JP | 03246515 A * | 11/1991 |
| JP | 2005-163012 | 6/2005 |

OTHER PUBLICATIONS

JPO Website Machine English Translation of JP 2000-169579, Sakurai et al, Jun. 20, 2000.*

(Continued)

*Primary Examiner* — Sophie Hon
(74) *Attorney, Agent, or Firm* — WPAT, P.C.; Anthony King

(57) ABSTRACT

A transparent substrate with optical compensation ability comprises polyimide having the following chemical formula:

wherein A and A' are cyclic aliphatic or aromatic compounds, B and B' are cyclic aliphatic or aromatic compounds. In particular, the refractive index of the transparent polyimide is $n_x = n_y > n_z$, that is, it has ability of adjusting the negative type c-plate phase difference, wherein $n_x$ represents the lateral refractive index, $n_y$ represents the longitudinal refractive index, $n_z$ represents the vertical refractive index along the thickness direction, and m and n are between 10 and 10,000.

12 Claims, 6 Drawing Sheets

(56) References Cited

U.S. PATENT DOCUMENTS

| | | |
|---|---|---|
| 7,054,049 B2 * | 5/2006 | Murakami et al. ............ 359/256 |
| 7,537,812 B2 * | 5/2009 | Kurosaki et al. ............... 428/1.2 |
| 7,659,360 B2 * | 2/2010 | Makinoshima et al. ...... 528/310 |
| 2002/0018966 A1 * | 2/2002 | Tanioka et al. ............... 430/327 |
| 2002/0188090 A1 * | 12/2002 | Yamashita et al. ............ 528/170 |
| 2003/0104232 A1 | 6/2003 | Kihara et al. |
| 2004/0062878 A1 * | 4/2004 | Mano et al. .................... 428/1.1 |

OTHER PUBLICATIONS

JPO Website Machine English Translation of JP 2003-231752, Nishio et al, Aug. 19, 2003.*

English Translation of JP 03246515 by Phoenix Translations, Kazue Takahashi et al., Nov. 1, 1991.*

Chinese Office Action dated Feb. 9, 2011 for 095141859, which is a corresponding application, that cites US 7054049 and US 2004/0062878 A1.

* cited by examiner

TRANSPARENT SUBSTRATE WITH OPTICAL COMPENSATION ABILITY AND LIQUID CRYSTAL DISPLAY USING THE SAME

BACKGROUND OF THE INVENTION (A) Field of the Invention

The present invention relates to a transparent substrate with optical compensation ability, and a liquid crystal display (LCD) using the same, and more particularly, to a transparent substrate with adjustable optical compensation ability of negative type c-plate phase difference and a liquid crystal display using the same.

(B) Description of the Related Art

The flexible display has become a new trend in the development of a new generation of displays because it has the following excellent properties: lightness, thinness, impact-resistance, not frangible, portability, bendability, ability to be rolled, wearability and greatly reduced cost due to continuous production in roll-to-roll. In order to meet the stringent process requirements of the active thin film transistor (TFT), the development of flexible substrate materials with high thermal resistance, low thermal coefficient of thermal expansion (CTE) and high chemical resistance will be a key factor in the development of a new generation of flexible display products.

The current optical plastic substrate materials including polyethylene terephthalate (PET), polyethylene naphthalate (PEN), polycarbonate (PC), and m-COC (Arton or Zeonor) cannot be adapted to the stringent process of the active TFT because the processing temperature will be limited by the glass transition temperatures (Tg) thereof, which are below 200° C., even though they are commercially available. The glass transition temperature of polyether sulfone (PES) is as high as 225° C.; however, it possesses a poor solvent-resistance and brittle cracking may occur over periods of high temperature (200° C.) operation.

The current polyimide plastic substrate with high temperature resistance and solvent resistance may meet current high-temperature processing requirements. However, it is useful only in reflective liquid crystal display panels, rather than transmissive liquid crystal display panels, due to its puce color. In addition, liquid crystal displays use the optical activity of liquid crystal molecules incorporating two polarization plates to show light and dark. However, the liquid crystal molecule has the birefringence property, and optical leakage frequently occurs when it is used in display panels, which results in such problems as limited viewing angle and poor contrast. Furthermore, the simplest method to obtain a wide viewing angle and increased contrast involves adhering an optical compensation film outside, which results in not only increased production cost but also increasing complexity in production of flexible liquid crystal displays.

SUMMARY OF THE INVENTION

One aspect of the present invention provides a transparent substrate with adjustable optical compensation ability of negative type c-plate phase difference, which can be applied to a flexible flat liquid crystal display to lower the production cost by omitting a wide viewing angle film.

A transparent substrate with adjustable optical compensation ability of negative type c-plate phase difference according to this aspect of the present invention comprises polyimide having the following chemical formula:

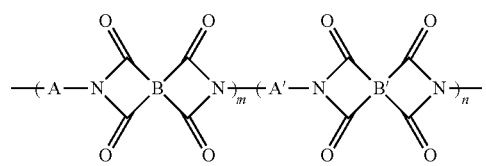

Wherein A and A' are cyclic aliphatic or aromatic compounds, B and B' are cyclic aliphatic or aromatic compounds, and $n_x=n_y>n_z$, wherein $n_x$ represents the lateral reflective index of the transparent substrate, $n_y$ represents the longitudinal reflective index of the transparent substrate, $n_z$ represents the reflective index of the transparent substrate along the thickness direction, and m and n are between 10 and 10,000.

Another aspect of the present invention provides a liquid crystal display comprising a transparent substrate with optical compensation ability, a polarization plate positioned on a first surface of the transparent substrate and a liquid crystal material positioned on a second surface of the transparent substrate. The transparent substrate comprises polyimide having the following chemical formula:

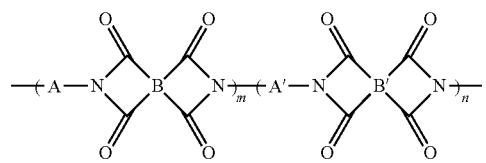

wherein A and A' are cyclic aliphatic or aromatic compounds, B and B' are cyclic aliphatic or aromatic compounds, and $n_x=n_y>n_z$, wherein $n_x$ represents the lateral reflective index of the transparent substrate, $n_y$ represents the longitudinal reflective index of the transparent substrate, $n_z$ represents the reflective index of the transparent substrate along the thickness direction, and m and n are between 10 and 10,000.

According to the present invention, diamine or dianhydride monomers having cyclic aliphatic structure are used to condensate with aromatic dianhydride or diamine to produce a colorless and transparent polyimide composition. Due to the introduction of cyclic aliphatic structure, the polyimide of the present invention has the properties of high transparence and colorlessness, which is different from the common conventional polyimide. In particular, the colorless transparent polyimide of the present invention possesses an adjustable optical compensation ability of negative type c-plate phase difference and therefore it can be used as a substrate material in flexible plastic display applications.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

Figure 1:
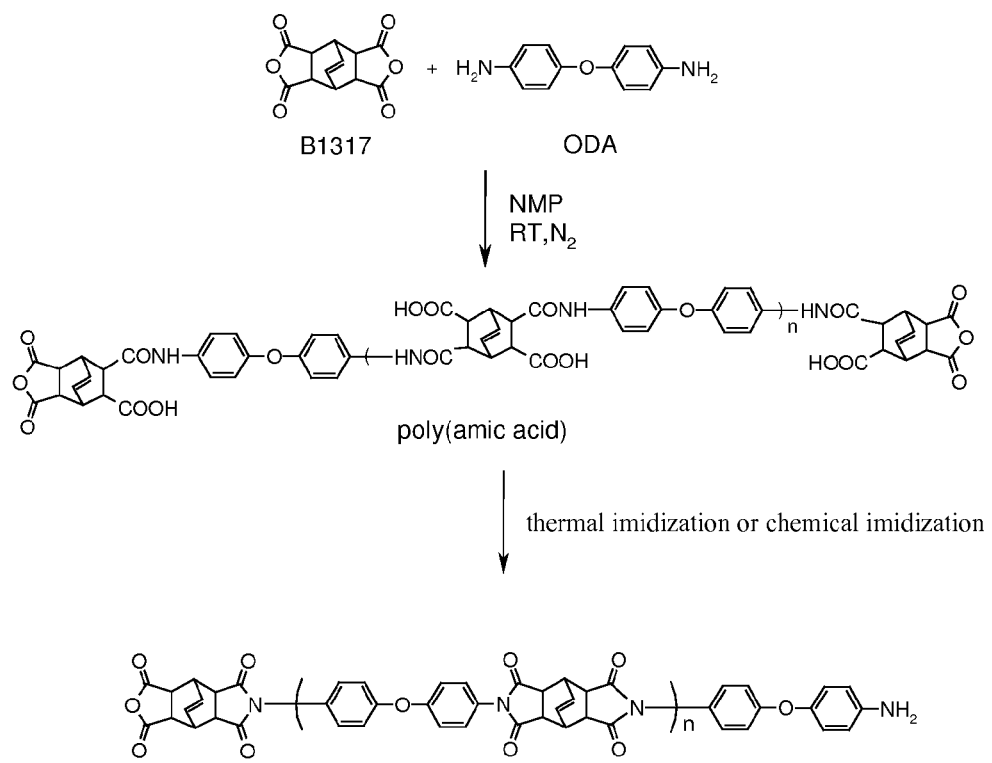
FIG. 1 and FIG. 2 illustrate methods for synthesizing polyimide.

The synthesis of polyimide is a typical polycondensation reaction, which can be classified into two methods. The first method includes two steps: firstly, diamine and dianhydride monomers are reacted in a polar solvent to produce poly(amic acid) (PAA) as a precursor of polyimide; then the precursor is baked at high temperature (300 to 400° C.) to perform imidization to convert the precursor into polyimide through dehydration and cyclization, as shown in FIG. 1. 4,4'-oxydianiline (ODA) may be used as diamine monomer, bicyclo[2.2.2]oct-7-ene-2,3,5,6-tetracarboxylic dianhydride (B1317) may be used as dianhydride monomer, and N-methyl-2-pyrrolidone (NMP) or N,N-dimethylacetamide (DMAc) may be used as polar solvent.

Figure 2:
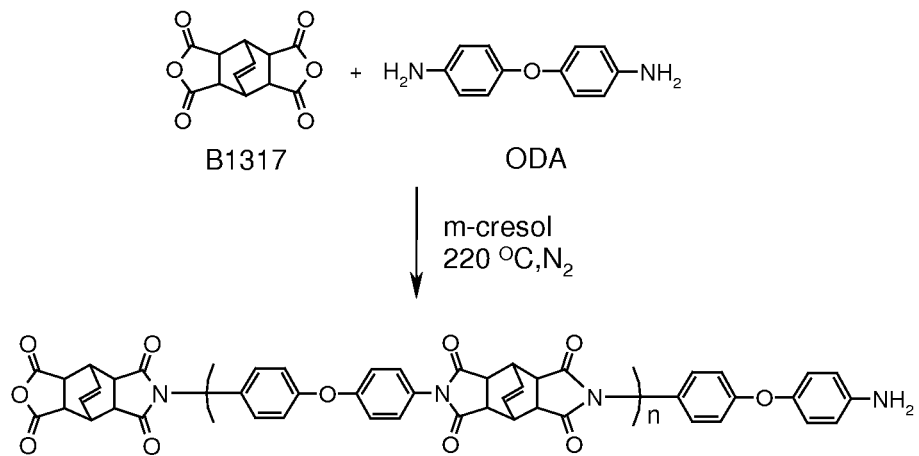

The second method is a chemical method. Diamine and dianhydride monomers are reacted in a phenols solvent, and heated to the reflux temperature to carry out the reaction of polyamic acid, and at the same time it is imidizated to be converted into polyimide through dehydration and cyclization, as shown in FIG. 2. 4,4'-oxydianiline may be used as diamine monomer, 4,4'-oxydianiline may be used as dianhydride monomer, and m-cresol or phenol may be used as the phenols solvent.

The transparent substrate of the present invention comprises polyimide having the following chemical formula:

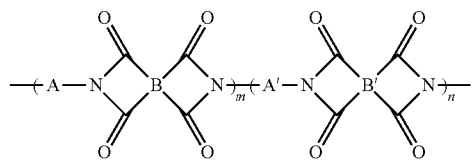

wherein A and A' are cyclic aliphatic or aromatic compounds, B and B' are cyclic aliphatic or aromatic compounds, and m and n are preferably between 10 and 10,000; and wherein the polyimide preferably has a molecular weight between 3,000 and 500,000 g/mole. In particular, A may be the same as or different from A', and B may be the same as or different from B'.

B and B' may be aromatic compounds, for example:

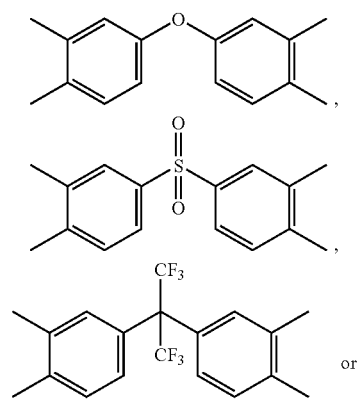

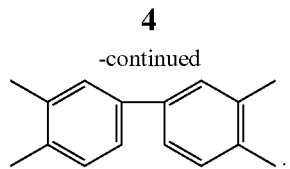

B and B' may also be cyclic aliphatic compounds, for example:

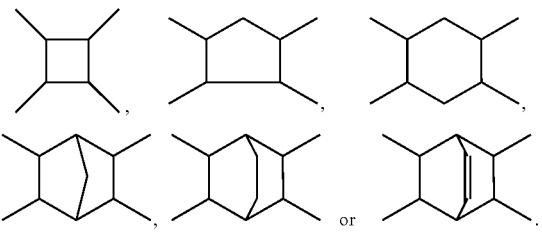

A and A' may be cyclic aliphatic compounds, for example:

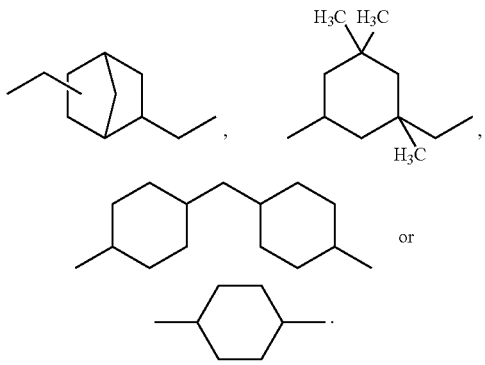

A and A' may be aromatic compounds, for example:

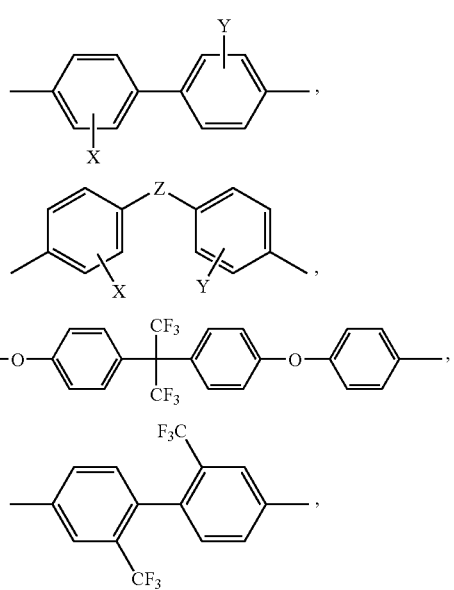

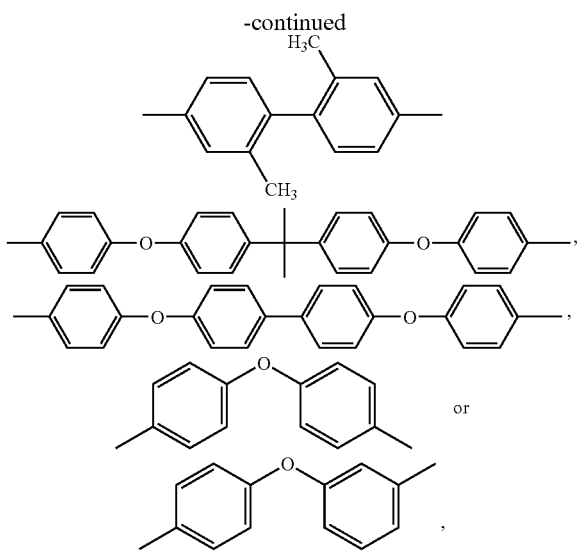

wherein X and Y are hydrogen, methyl, trifluoromethyl, hydroxyl, C1-18alkyl, bromine, chlorine or iodine; Z is —O—, —CH2-, —S—, —SO2-, —C(CH3)2-, —Ar—O—Ar—, —Ar—CH2-Ar—, —O—Ar—C(CH3)2-Ar—O—, —O—Ar—Ar—O—, —O—Ar—C(CF3)2-Ar—O— or —Ar—C(CH3)2-Ar—, wherein Ar is benzene.

Comparative Example 1

6FDA-TFMB (PI-FT)

Figure 3:
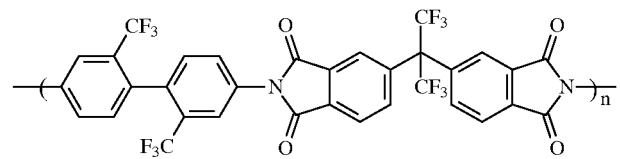
FIG. 3 and FIG. 4 illustrate the molecular structures of the polyimide film material according to the comparative examples of the present invention.

4.5 g 2,2'-bis(trifluoromethyl)benzidine (TFMB) diamine is dissolved in 28 g DMAc in a 3-neck flask flushed with nitrogen at room temperature. After TFMB is fully dissolved, 3.18 g 2,2'-bis(3,4-dicarboxyphenyl)hexafluoropropane dianhydride (6FDA) is then added. After 6FDA is fully dissolved, stirring is continued for 3 hours to form a viscous solution of polyamic acid. Subsequently, the solution is coated on a glass substrate with a blade, heated to 100° C., 200° C. and 300° C. for 1 hour respectively, and baked to carry out imidization to form a highly transparent colorless polyimide film having a molecular structure as shown in FIG. 3.

Comparative Example 2

B1317-BAPB-co-B1317-BAPPm (PI-BAB)

Figure 4:
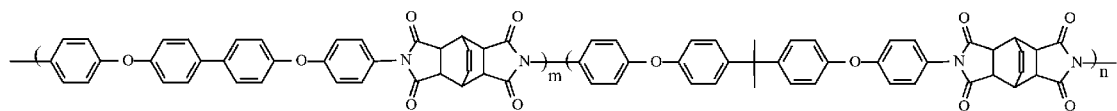

3.05 g 4,4-bis(4-aminophenoxy)biphenyl (BAPB) and 1.46 g 4,4-bis(4-aminophenoxy)propane (BAPPm) diamine are dissolved in 30 g DMAc in a 3-neck flask flushed with nitrogen at room temperature. After BAPB and BAPPm are fully dissolved, 3 g B1317 dianhydride is then added. After B1317 is fully dissolved, stirring is continued for 3 hours to form a viscous solution of polyamic acid. Subsequently, the solution is coated on a glass substrate with a blade, heated to 100° C., 200° C. and 300° C. for 1 hour respectively, and baked to carry out imidization to form a highly transparent colorless polyimide film having a molecular structure as shown in FIG. 4.

Embodiment 1

6FDA-m-TB-HG-co-6FDA-DACH (PI-FTD)

Figure 5:
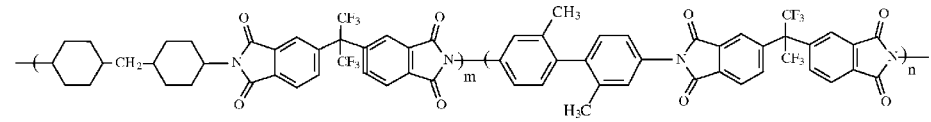
FIG. 5 to FIG. 10 illustrate the molecular structures of the polyimide film material according to the embodiments of the present invention.

1.64 g 2,2'-dimethyl-4,4'-diamino biphenyl (m-TB-HG) and 0.70 g 4,4-dimethylene bis(cyclohexylamine) (DACH) diamine are dissolved in 30 g DMAc in a 3-neck flask flushed with nitrogen at room temperature. After m-TB-HG and DACH are fully dissolved, 5 g 6FDA dianhydride is then added. After 6FDA is fully dissolved, stirring is continued for 3 hours to form a viscous solution of polyimide. Subsequently, the solution is coated on a glass substrate with a blade, heated to 100° C., 200° C. and 300° C. for 1 hour respectively, and baked to carry out imidization to form a highly transparent colorless polyimide film having a molecular structure as shown in FIG. 5.

Embodiment 2

6FDA-ODA-co-6FDA-DACH (PI-FOD)

Figure 6:
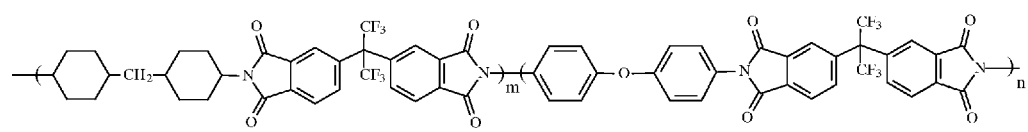

1.10 g ODA and 1.16 g DACH diamine are dissolved in 30 g DMAc in a 3-neck flask flushed with nitrogen at room temperature. After ODA and DACH are fully dissolved, 5 g 6FDA dianhydride is then added. After 6FDA is fully dissolved, stirring is continued for 3 hours to form a viscous solution of polyamic acid. Subsequently, the solution is coated on a glass substrate with a blade, heated to 100° C., 200° C. and 300° C. for 1 hour respectively, and baked to carry out imidization to form a highly transparent colorless polyimide film having a molecular structure as shown in FIG. 6.

Embodiment 3

6FDA-DACH-co-DSDA-DACH (PI-FSD-I)

Figure 7:
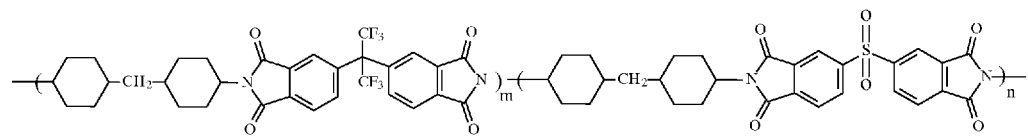

2.49 g DACH diamine is dissolved in 30 g DMAc in a 3-neck flask flushed with nitrogen at room temperature. After DACH is fully dissolved, 3.5 g 6FDA and 1.5 g 3,3',4,4'-diphenylsulfone tetracarboxylic dianhydride (DSDA) are added. After 6FDA and DSDA are fully dissolved, stirring is continued for 3 hours, to form a viscous solution of polyamic acid. Subsequently, the solution is coated on a glass substrate with a blade, heated to 100° C., 200° C. and 300° C. for 1 hour respectively, and baked to carry out imidization to form a highly transparent colorless polyimide film having a molecular structure as shown in FIG. 7.

Embodiment 4

6FDA-DACH-co-DSDA-DACH (PI-FSD-II)

Figure 8:
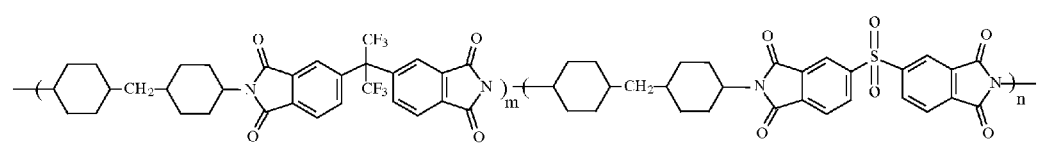

2.60 g DACH diamine is dissolved in 30 g DMAc in a 3-neck flask flushed with nitrogen at room temperature. After DACH is fully dissolved, 2.5 g 6FDA and 2.5 g DSDA dianhydride are added. After 6FDA and DSDA are fully dissolved, stirring is continued for 3 hours to form a viscous solution of polyamic acid. Subsequently, the solution is coated on a glass substrate with a blade, heated to 100° C., 200° C. and 300° C. for 1 hour respectively, and baked to carry out imidization to form a highly transparent colorless polyimide film having a molecular structure as shown in FIG. 8.

Embodiment 5

6FDA-DACH-co-DSDA-DACH (PI-FSD-III)

Figure 9:
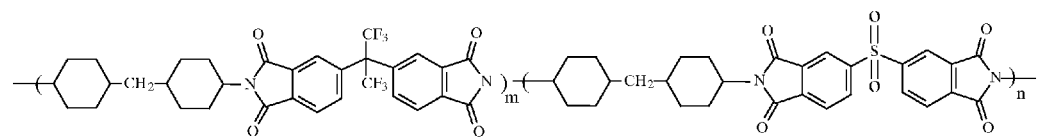

2.71 g DACH diamine is dissolved in 30 g DMAc in a 3-neck flask flushed with nitrogen at room temperature. After DACH is fully dissolved, 1.5 g 6FDA and 3.5 g DSDA dianhydride are added. After 6FDA and DSDA are fully dissolved, stirring is continued for 3 hours to form a viscous solution of polyamic acid. Subsequently, the solution is coated on a glass substrate with a blade, heated to 100° C., 200° C. and 300° C. for 1 hour respectively, and baked to carry out imidization to form a highly transparent, colorless polyimide film having a molecular structure as shown in FIG. 9.

Embodiment 6

B1317-BAPPm-co-B1317-DACH (PI-BBD)

Figure 10:
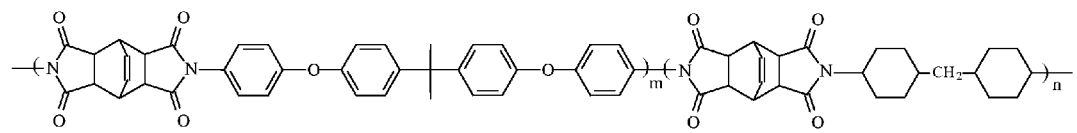

1.4 g DACH diamine is dissolved in 31 g DMAc in a 3-neck flask flushed with nitrogen at room temperature. After DACH is fully dissolved, 2.84 g BAPPm diamine is added. After BAPPm is fully dissolved, 3.5 g B1317 dianhydride is added. After B1317 is fully dissolved, stirring is continued for 3 hours to form a viscous solution of polyamic acid. Subsequently, the solution is coated on a glass substrate with a blade, heated to 100° C., 200° C. and 300° C. for 1 hour respectively, and baked to carry out imidization to form a highly transparent, colorless polyimide film having a molecular structure as shown in FIG. 10.

The composition recipe of the transparent substrate according to the present invention can be any of the following combinations:
1. copolymer derived from aromatic dianhydride and aromatic diamine and cyclic aliphatic diamine in various proportions;
2. copolymer derived from aromatic dianhydride and cyclic aliphatic dianhydride and cyclic aliphatic diamine in various proportions;
3. copolymer derived from cyclic aliphatic dianhydride and aromatic diamine in various proportions;
4. copolymer derived from cyclic aliphatic dianhydride and aromatic diamine and cyclic aliphatic diamine in various proportions.

Figure 11:
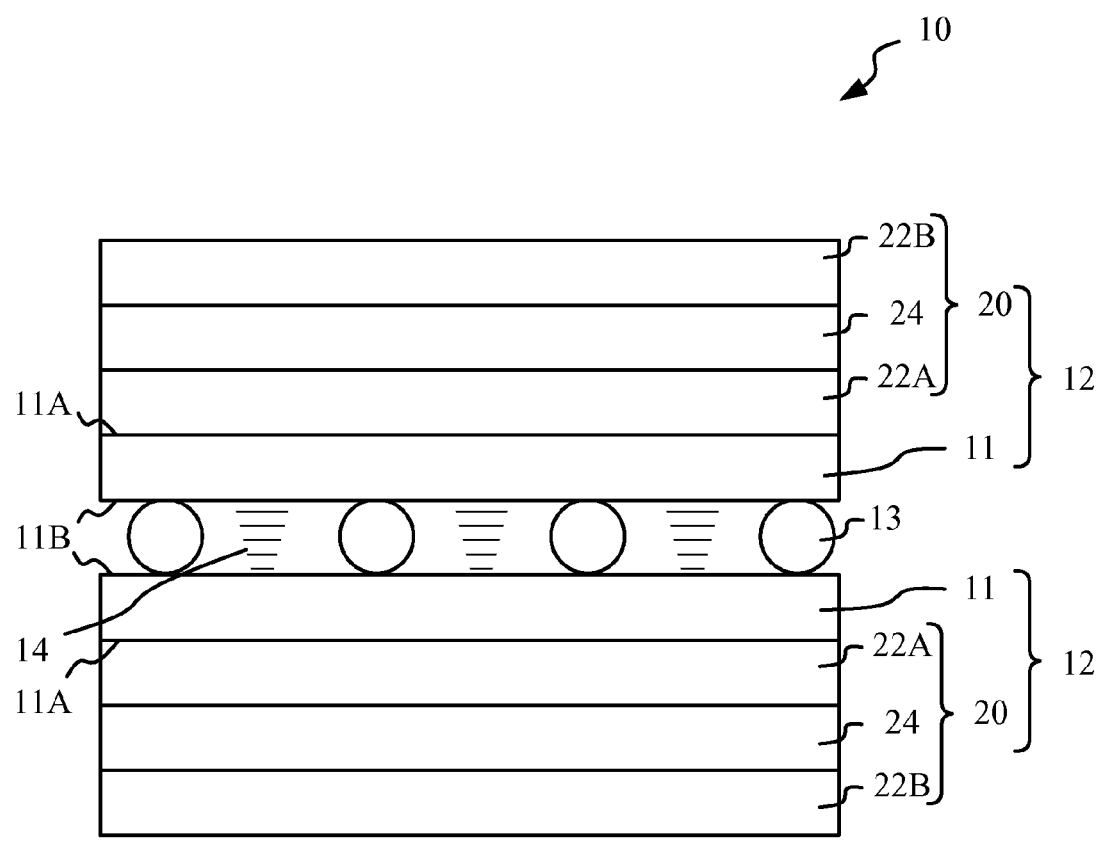
FIG. 11 illustrates a liquid crystal display according to one embodiment of the present invention.

FIG. 11 illustrates a liquid crystal display 10 according to one embodiment of the present invention. The liquid crystal display 10 comprises two substrates 12, a plurality of spacers 13 and a liquid crystal material 14, wherein the substrate 12 comprises a transparent substrate 11 and a polarization plate 20. The substrate 20 is positioned on a first surface 11A of the transparent substrate 11, the spacers 13 are positioned on a second surface 11B of the transparent substrate 11, and the

TABLE 1

Properties of the transparent polyimide

| | Polymer | Thickness (μm) | Haze (%) | Transmission (%) | Yellowing index | Tg (° C.) | CTE (ppm/° C.) | $R_{th}$ (nm) |
|---|---|---|---|---|---|---|---|---|
| Comparative examples | PES | 200 | 0.30 | 89.0 | 0.97 | 225 | 58 | 25 |
| | Kapton | 25 | 0.72 | 73.6 | 82.34 | 318 | 16 | 6923 |
| | Ube | 51 | 2.49 | 32.1 | 66.46 | 332 | 23 | >9999 |
| Embodiments | PI-FT | 55 | 2.01 | 90.4 | 1.12 | 347 | 68 | 754 |
| | PI-BAB | 59 | 0.54 | 89.6 | 1.93 | 350 | 74 | 958 |
| | PI-FTD | 67 | 1.74 | 90.5 | 3.82 | 326 | 70 | 235 |
| | PI-FOD | 48 | 1.63 | 90.1 | 2.67 | 274 | 72 | 143 |
| | PI-FSD-☐ | 68 | 1.70 | 90.4 | 2.73 | 305 | 63 | 262 |
| | PI-FSD-☐ | 59 | 1.73 | 90.1 | 2.85 | 294 | 60 | 137 |
| | PI-FSD-III | 61 | 1.79 | 89.7 | 3.01 | 282 | 61 | 67 |
| | PI-BBD | 53 | 0.82 | 90.2 | 2.27 | 317 | 75 | 158 |

Tg represents the glass transition temperature; CTE represents the coefficient of thermal expansion; $R_{th}$ represents the light retardation calculated according to the equation $R_{th}=\{(n_x+n_y)/2-n_z\}\times d$, d represents the thickness of the transparent substrate, $n_x$ represents the lateral refractive index of the transparent substrate, $n_y$ represents the longitudinal refractive index of the transparent substrate, and $n_z$ represents the refractive index of the thickness direction.

The present transparent substrate has the optical properties of $n_x=n_y>n_z$, that is, it has the ability of negative type c-plate phase difference compensation. The transparent substrate of the present invention may have a thickness between 30 and 200 μm, preferably between 50 and 150 μm. In particular, the transparent substrate according to the embodiments of the present invention has an $R_{th}$ value between 50 and 400 nm, preferably between 100 and 250 nm. Comparatively, the examples and other conventional polymers (Kapton and Ube) cannot be used as substrate materials for the flexible plastic displays due to the considerably large $R_{th}$ value thereof. In addition, the conventional PES material cannot be applied to high-temperature fabrication processes for liquid crystal displays, and has no optical compensation ability, a very low glass transition temperature (only 225° C.) and poor etching-resistance. Thus it cannot be used as the substrate material for liquid crystal displays although it has desirable haze, high transmittance and yellowing index.

liquid crystal material 14 is positioned among the spacers 13. The polarization plate 20 comprises two supporting layers 22A and 22B and a polarization layer 24 sandwiched between the two supporting layers 22A and 22B. The supporting layers 22A and 22B can be made of triacetyl cellulose (TAC), and the polarization layer 24 is made of polyvinyl alcohol (PVA).

The transparent substrate 11 of the present invention has optical compensation ability such that the production cost of the optical compensation film adhered outside can be eliminated. In addition, the transparent substrate 11 of the present invention has the properties of high transparence, high thermal resistance and high chemical resistance, thus meeting the requirements of liquid crystal displays in optical and process condition. In general, the transparent substrate 11 of the present invention may be directly formed on the current glass substrate without fixing, and the fixing needs to use adhesive resin as the conventional substrates. The transparent substrate 11 can be readily removed after multiple lithographic and etching processes (or processing in specific water bath) of liquid crystal displays of TFT without any residual adhesive such that the process of liquid crystal displays of TFT is obviously simplified. Furthermore, the polyimide substrate material of the present invention is also applicable to flexible displays including flexible liquid crystal display, PDP, FED, SED, E-ink, E-Paper and OLED.

According to the present invention, diamine or dianhydride monomers having cyclic aliphatic structure are used to condensate with aromatic dianhydride or diamine to produce a colorless and transparent polyimide composition. Due to the introduction of cyclic aliphatic structure, the polyimide of the present invention has the properties of high transparence and colorlessness, which is different from the common conventional polyimide. In particular, the colorless transparent polyimide of the present invention possesses an adjustable optical compensation ability of negative type c-plate phase difference and therefore can be used as a substrate material in the flexible plastic display.

The above-described embodiments of the present invention are intended to be illustrative only. Numerous alternative embodiments may be devised by those skilled in the art without departing from the scope of the following claims.

What is claimed is:

1. A liquid crystal display, comprising:

a transparent substrate with optical compensation ability consisting of polyimide having the following chemical formula:

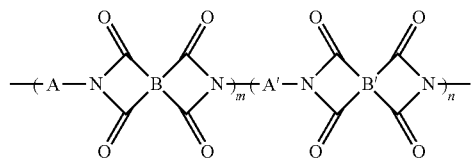

wherein A and A' are selected from the group consisting of:

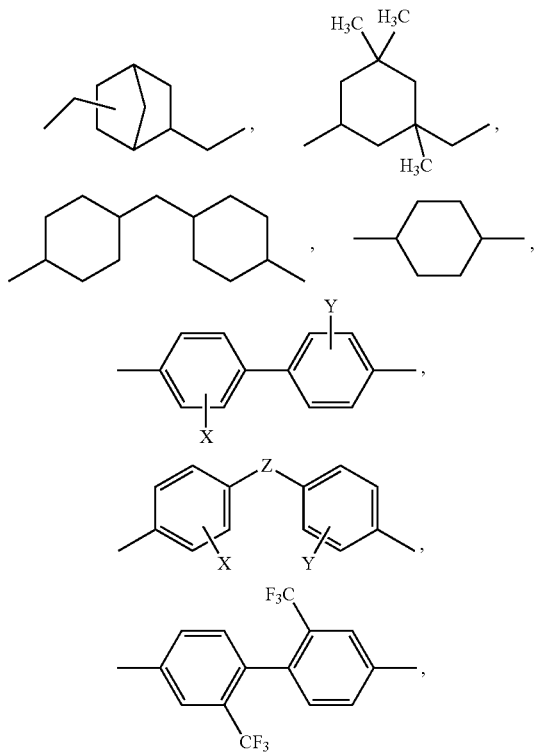

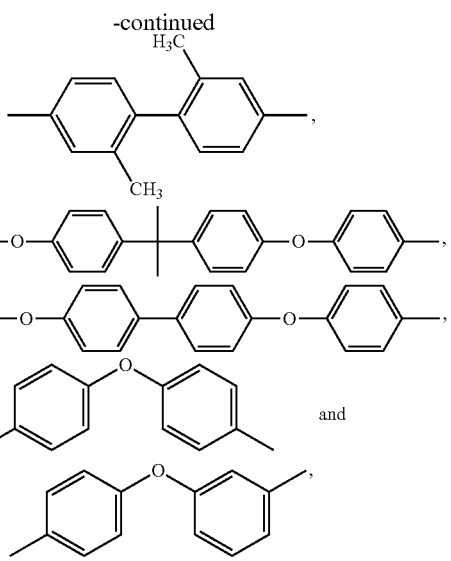

and

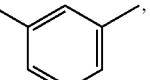

wherein X and Y are hydrogen, methyl, trifluoromethyl, hydroxyl, C1-18alkyl, bromine, chlorine or iodine; Z is —O—, —CH2-, —S—, —SO2-, —C(CH3)2-, —Ar—O—Ar—, —Ar—CH2-Ar—, —O—Ar—C(CH3)2—Ar—O—, —O—Ar—Ar—O—, —O—Ar—C(CF3)2-Ar—O— or —Ar—C(CH3)2-Ar—, and Ar is benzene;

wherein B and B' are cyclic aliphatic or aromatic compounds, and $n_x=n_y>n_z$, wherein $n_x$ represents the lateral refractive index of the transparent substrate, $n_y$ represents the longitudinal refractive index of the transparent substrate, $n_z$ represents a refractive index of the transparent substrate along the thickness direction, and m and n are integers between 10 and 10,000, wherein either A is not identical to A' or B is not identical to B', wherein at least one of A, A', B and B' is a cyclic aliphatic compound;

wherein the transparent substrate has a thickness between 51 and 200 μm;

wherein the transparent substrate has a light retardation ($R_{th}$) between 50 and 400 nm, the light retardation ($R_{th}$) is calculated according to the equation $R_{th}=\{(n_x+n_y)/2-n_z\}\times d$, and d represents the thickness of the transparent substrate;

a polarization plate positioned on a first surface of the transparent substrate;

a plurality of spacers disposed on a second surface of the transparent substrate;

a liquid crystal material positioned on the second surface of the transparent substrate;

the polarization plate comprises two supporting layers and a polarization layer is disposed between the two supporting layers.

2. The liquid crystal display claimed in claim 1, wherein the transparent substrate has a thickness between 51 and 150 μm.

3. The liquid crystal display claimed in claim 1, wherein the transparent substrate has a light retardation ($R_{th}$) between 100 and 250, the light retardation ($R_{th}$) is calculated according to the equation $R_{th}=\{(n_x+n_y)/2-n_z\}\times d$, and d represents the thickness of the transparent substrate.

4. The liquid crystal display claimed in claim 1, wherein A is the same as A'.

5. The liquid crystal display claimed in claim 1, wherein A is different from A'.

6. The liquid crystal display claimed in claim 1, wherein B is the same as B'.

7. The liquid crystal display claimed in claim 1, wherein B is different from B'.

8. The liquid crystal display claimed in claim 1, wherein B and B' are selected from the group consisting of:

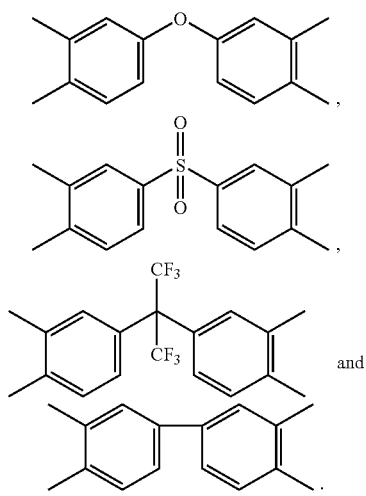

9. The liquid crystal display claimed in claim 1, wherein B and B' are selected from the group consisting of:

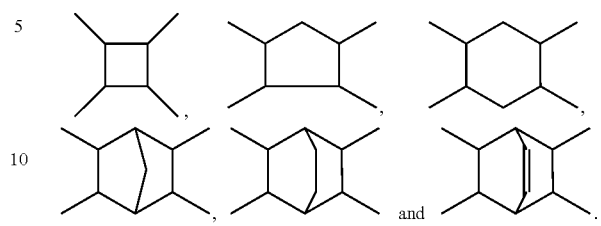

10. The liquid crystal display claimed in claim 1, wherein the polarization plate comprises two supporting layers and one polarization layer sandwiched between the two supporting layers.

11. The liquid crystal display claimed in claim 10, wherein the supporting layer is made of triacetyl cellulose, and the polarization layer is made of polyvinyl alcohol.

12. The liquid crystal display claimed in claim 1, wherein the polyimide has a molecular weight between 3,000 and 500,000 g/mole.

* * * * *